United States Patent
Heiland

(10) Patent No.: US 8,073,571 B2
(45) Date of Patent: Dec. 6, 2011

(54) METHOD AND DEVICE FOR FREQUENCY-RESPONSE CORRECTION IN VIBRATION ISOLATION SYSTEMS

(75) Inventor: Peter Heiland, Raunheim (DE)

(73) Assignee: Integrated Dynamics Engineering GmbH, Raunheim (DE)

( * ) Notice: Subject to any disclaimer, the term of this patent is extended or adjusted under 35 U.S.C. 154(b) by 385 days.

(21) Appl. No.: 12/108,974

(22) Filed: Apr. 24, 2008

(65) Prior Publication Data

US 2008/0294292 A1 Nov. 27, 2008

(30) Foreign Application Priority Data

May 25, 2007 (EP) .................................... 07010460

(51) Int. Cl.
*G05B 21/00* (2006.01)
*G05B 19/18* (2006.01)
*G01F 17/00* (2006.01)
*G01H 1/00* (2006.01)

(52) U.S. Cl. ............... 700/280; 700/6; 702/56; 73/570; 73/579

(58) Field of Classification Search .................. 700/6, 8, 700/55, 174–178, 275, 280; 702/56, 190–197; 708/300, 819; 318/611, 619, 623, 649; 73/570, 73/579; 267/136, 140.11
See application file for complete search history.

(56) References Cited

U.S. PATENT DOCUMENTS

| | | | |
|---|---|---|---|
| 4,631,683 A * | 12/1986 | Thomas et al. | ............... 700/159 |
| 4,796,873 A | 1/1989 | Schubert | |
| 4,937,758 A * | 6/1990 | Hayden et al. | ................ 700/280 |
| 5,617,176 A * | 4/1997 | Matsuzawa et al. | ............ 396/55 |
| 5,649,018 A * | 7/1997 | Gifford et al. | ............. 381/71.14 |
| 7,193,806 B1 * | 3/2007 | Albrecht et al. | ................ 360/75 |

FOREIGN PATENT DOCUMENTS

| | | |
|---|---|---|
| DE | 103 56 561 A1 | 6/2005 |
| EP | 0 927 380 B1 | 7/1999 |
| JP | 08200435 | 8/1996 |

OTHER PUBLICATIONS

Nelson, Peter G., "An active vibration isolation system for inertial reference and precision measurement", 8127 Review of scientific instruments, 62(1991) Sep. No. 9, pp. 2069-2075, XP000262841, New York, US.

* cited by examiner

*Primary Examiner* — Sean Shechtman
(74) *Attorney, Agent, or Firm* — DeMont & Breyer, LLC

(57) ABSTRACT

To achieve improved frequency-response correction of a vibration-signal transmitter in a vibration isolation system, the invention proposes a method in which an analog sensor signal representing vibrations is generated through the use of a vibration-signal transmitter, this sensor signal is amplified for correcting frequency-dependent sensitivity of the vibration-signal transmitter, an actuator control signal is generated by processing the amplified sensor signal, and an actuator is controlled with the actuator control signal for counteracting the vibrations, wherein the amplification of the sensor signal includes first amplification through the use of an analog amplification stage and second amplification through the use of a digital amplification stage. The invention further proposes a correction device and also a vibration isolation system for carrying out the method.

16 Claims, 3 Drawing Sheets

METHOD AND DEVICE FOR FREQUENCY-RESPONSE CORRECTION IN VIBRATION ISOLATION SYSTEMS

FIELD OF THE INVENTION

The invention relates, in general, to the control and regulation of a vibration isolation system with vibration-signal transmitters for delivering analog sensor signals and actuators for suppressing vibrations by processing sensor signals into actuator control signals for controlling the actuators, and, in particular, to a method and device for frequency-response correction of the sensor signals delivered by the vibration-signal transmitters.

BACKGROUND OF THE INVENTION

From EP 0 927 380 B1, a method and device are known for limiting vibrations that occur within a vibration isolation system or that are to be suppressed to a low-frequency range.

Furthermore, for vibration isolation, velocity sensors according to the moving coil principle, also called geophones, are used, among other things, as vibration sensors. For low hardware costs, they offer large bandwidth and sensitivity to vibrations. The sensitivity of these sensors is rather linear starting at a lower cutoff frequency, but drops significantly at low frequencies starting from this cutoff frequency. For typical geophones used in vibration isolation systems, this cutoff frequency lies at ca. 4 Hz. However, because the control bandwidth should typically equal at least 0.1 Hz, it is necessary to raise the sensitivity curve of the geophone below 4 Hz.

Analog circuits, which are constructed for this purpose and which can achieve a frequency response correction between 0.5 and 4 Hz, are known. At low frequencies, very high amplification is necessary to achieve linearity. For analog implementation, this generates very high noise in the sensor signal. In addition, analog electrical components for frequency-response correction are cost-intensive and have large dimensions. The large dimensions restrict, for example, the possibilities for placing the components for the frequency-response correction close to the sensor, because little space is typically available close to the damper.

One problem is thus to present a way to achieve improved frequency-response correction for a vibration-signal transmitter in a vibration isolation system.

SUMMARY OF THE INVENTION

Accordingly, a method according to the invention for controlling a vibration isolation system includes the generation of an analog sensor signal representing vibrations by means of at least one vibration-signal transmitter, the frequency-dependent amplification of the sensor signal for correcting frequency-dependent sensitivity of the vibration-signal transmitter, the generation of at least one actuator control signal by processing the amplified sensor signal, and the control of at least one actuator with the actuator control signal for counteracting the vibrations, where the amplification of the sensor signal includes a first amplification by means of an analog amplification stage and a second amplification by means of a digital amplification stage, the analog and digital amplification stages being connected in series. Appropriately, the signal is digitized upstream of the digital amplification stage by means of an A/D converter. The digital amplification stage is thus preferably connected downstream of the analog amplification stage.

The invention thus provides hybrid frequency-response correction for use in vibration isolation systems, where this correction consists of an analog part and a digital part. The frequency-response correction is used to raise the sensitivity of the vibration-signal transmitter at low frequencies, in order thereby to achieve, specifically, an essentially linear sensitivity of the vibration-signal transmitter over a given frequency range, where the given frequency range preferably has a lower limit of no more than 0.1 Hz.

Because the sensitivity of a vibration-signal transmitter above a cutoff frequency typically has a sufficiently linear sensitivity, the method advantageously amplifies the sensor signal essentially only below this cutoff frequency, with the cutoff frequency preferably lying at approximately 4 Hz.

The method can be applied in an especially advantageous way if the control system for vibration isolation has a purely digital structure—which is true for the vast majority of cases. Here, the digital amplification is advantageously performed within the control system immediately after the sensor signal is digitized.

Two basic embodiments of the method can be distinguished. In a first embodiment, the components for analog and for digital frequency-response correction operate over the entire frequency range, with each part applying half the necessary correction. Accordingly, the first and second amplification is performed with an essentially equal frequency dependence.

In a second embodiment, the analog and the digital frequency-response correction parts divide the frequency range, with the components for digital correction correcting the lower frequencies and those for analog correction correcting the higher frequencies. Accordingly, the sensor signal is advantageously amplified by the first analog amplification over a first frequency range and by the second digital amplification in a second frequency range, which is different than the first, with the analog amplification preferably taking place at higher frequencies than the digital amplification.

In this way it is ensured that in the first embodiment for the analog frequency-response correction, still only half of the amplification is needed compared with full analog frequency-response correction or, in the second embodiment, the components for analog frequency-response correction need only be tuned to significantly higher frequencies. Both embodiments reduce the noise insertion by electrical components and also the size of the structural form. The advantages of at least partially analog frequency-response correction, for example, higher accuracy, however, are obtained.

Obviously, the frequency ranges in which the analog frequency-response correction or the digital frequency-response correction is performed can also overlap. In particular, digital amplification adapted to the analog amplification can be performed for achieving frequency-response correction over a given entire frequency range.

A correction device according to the invention for correcting frequency-dependent sensitivity of a vibration-signal transmitter of a vibration isolation system includes an analog amplification stage, constructed for the frequency-dependent amplification of a sensor signal generated by the vibration-signal transmitter in a first frequency range and a digital amplification stage, constructed for the frequency-dependent amplification of the digitized signal in a second frequency range, where the analog and the digital amplification stages are connected in series. Advantageously, the signal amplified by means of the analog amplification stage is digitized by means of an A/D converter, where the digital amplification stage is preferably directly connected downstream of the A/D converter.

The correction device is preferably constructed for the purpose of correcting the frequency-dependent sensitivity of the vibration-signal transmitter essentially below a cutoff frequency, particularly below approximately 4 Hz.

In a first preferred embodiment, the first and second amplification stages are constructed for amplification with an essentially equal frequency dependence.

In a second preferred embodiment, the first amplification stage is constructed for amplification over a first frequency range, and the second amplification stage is constructed for amplification over a second frequency range, which is different from the first, with the first frequency range preferably lying at higher frequencies than the second frequency range.

Preferably, the digital amplification stage is arranged in a digital control device of the vibration isolation system. In this embodiment, the frequency-response correction is divided into two steps, where the analog part is still arranged outside of the digital control system and the digital part is arranged within the control system downstream of the A/D converter for digitizing the sensor signal.

Furthermore, a vibration isolation system, which includes a correction device as described above, also lies within the scope of the invention.

The invention presents, for the first time, a hybrid design for frequency-response correction for geophone sensors, which has the result that the noise can be reduced and the structural form for the analog circuit can be made smaller.

The need for digital "post-processing" is naturally inherent to vibration isolation systems with a digital control system and represents no additional expense.

BRIEF DESCRIPTION OF THE DRAWINGS

The invention will be described in more detail below with reference to preferred embodiments and with reference to the enclosed drawings. Here, identical reference symbols in the drawings designate identical or similar parts.

Shown are.

DETAILED DESCRIPTION

Figure 1:
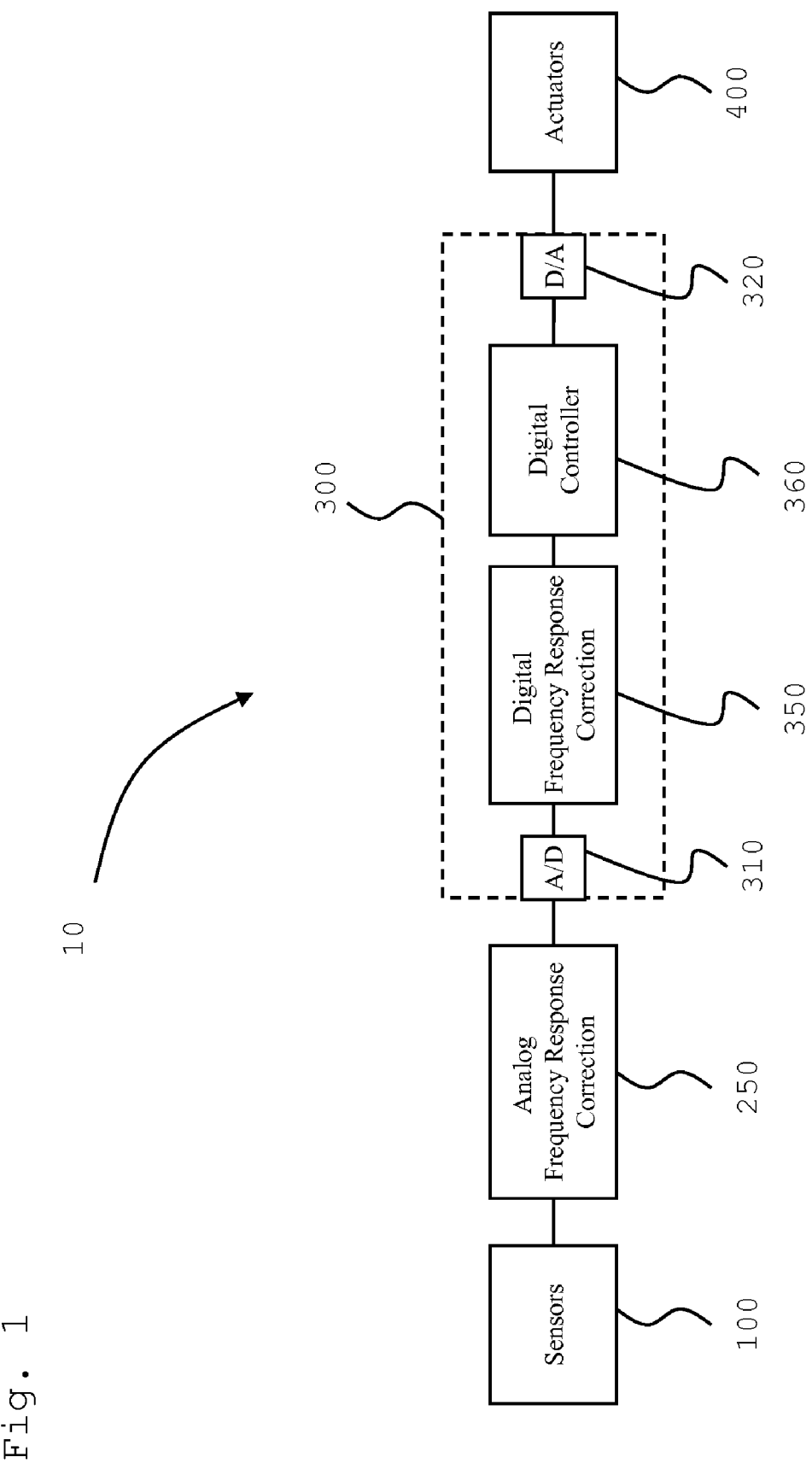
FIG. 1 a schematic diagram of a vibration isolation system in a preferred embodiment of a correction device for correcting frequency-dependent sensitivity of a vibration-signal transmitter of the vibration isolation system, FIG. 2 a sensitivity curve of a typical damped geophone, FIG. 3 a schematic diagram of the correction achieved by analog and digital amplification for the sensitivity of a vibration-signal transmitter according to a first preferred embodiment of the method according to the invention, FIG. 4 a schematic diagram of the correction achieved by analog and digital amplification for the sensitivity of a vibration-signal transmitter according to a second preferred embodiment of the method according to the invention, and FIG. 5 schematically, the contribution provided by the analog and digital amplification for the frequency-response correction in the embodiment shown in FIG. 4.

FIG. 1 shows a preferred embodiment of a vibration isolation system 10. The control device, shown greatly simplified in FIG. 1 for active vibration isolation system applications, can be constructed in principle by means of known electronic components. In the embodiment shown, at least one sensor 100 is connected as a vibration-signal transmitter for delivering analog sensor signals on the input side to a control system for processing the sensor signals into actuator control signals. The control system is connected on the output side to at least one actuator 400, so that the actuators 400 are controllable by feeding actuator control signals for counteracting the detected vibrations. Typically, several sensors 100 and several actuators 400 are provided.

For controlling the vibration isolation system 10, a digital controller 360 is used, which performs the calculations necessary for digitally processing the sensor signals into actuator control signals. A digital processor used for the processing typically comprises at least one digital signal processor or so-called DSP.

According to the invention, the sensitivity of the sensors 100 in the low-frequency range, typically below 4 Hz, is raised by frequency-response correction. The frequency-response correction is performed in two steps by means of an analog amplification stage 250 and a digital amplification stage 350 connected to the output. The amplification stages 250 and 350 are preferably constructed to amplify signals of several sensors.

In the embodiment shown, the digital amplification stage 350 is arranged together with the digital controller 360 in a common control device 300. The control device 300 further comprises, on the input side, at least one A/D converter 310 for digitizing at least one analog output signal of the amplification stage 250, as well as at least one output-side D/A converter 320. The output-side D/A converter 320 ensures that the calculated actuator signals are converted into current/voltage signals, which are fed to the actuators 400, if necessary, by means of another, not-shown amplifier.

One essential advantage of the invention consists in the combination of two different technologies for frequency-response correction for vibration-isolating applications. Based on successive analog and digital frequency-response correction, the advantages of both technologies are used in an advantageous and effective way, in order to allow, overall, optimum frequency-response correction, i.e., linear sensor sensitivity over the largest possible frequency range, wherein, in particular, noise in the signal and the structural size of the device for analog frequency-response correction are reduced compared with a purely analog circuit.

Figure 2:
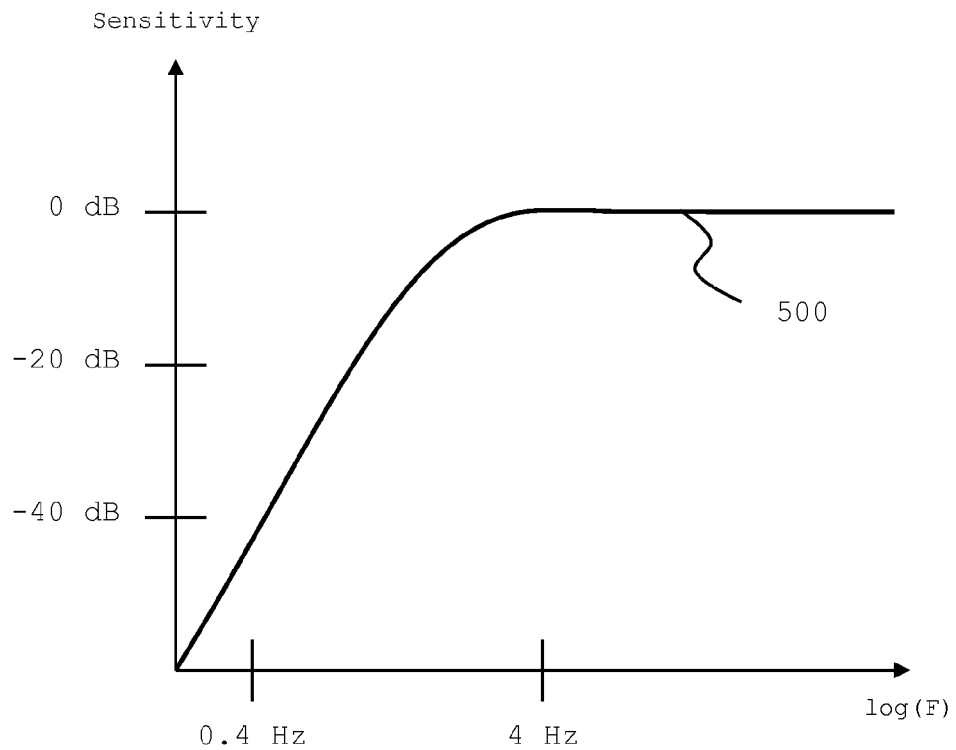

The typical profile of a sensitivity curve 500 of a damped geophone is shown in FIG. 2. It is clear that the sensitivity has a linear profile starting at the lower cutoff frequency of approximately 4 Hz, but drops significantly at low frequencies starting from this cutoff frequency.

Figure 3:
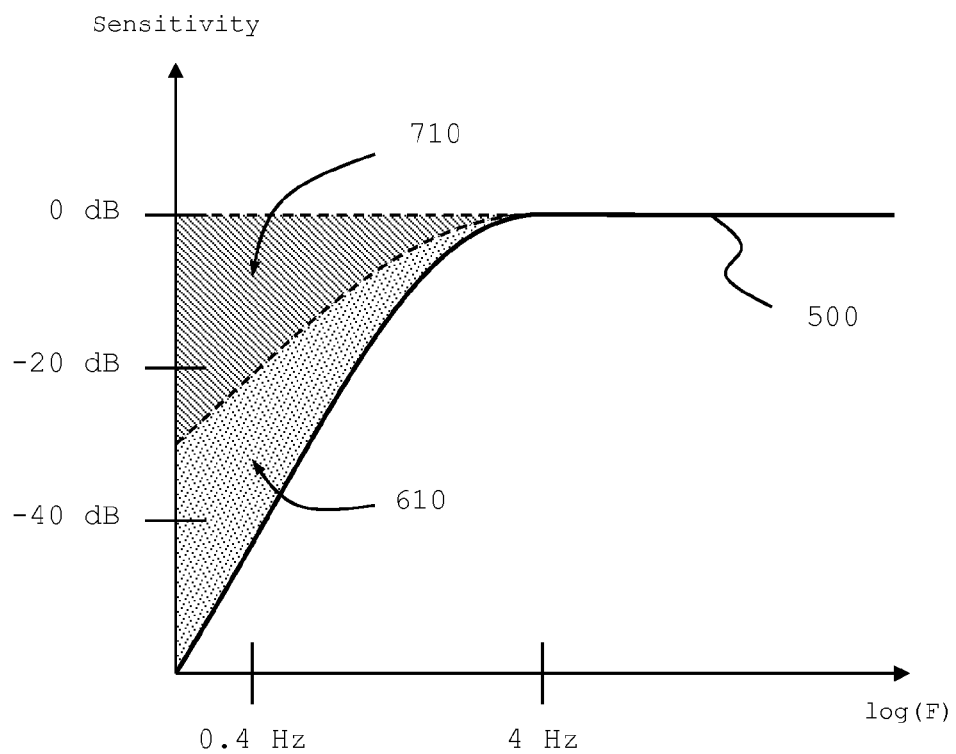
Figure 4:
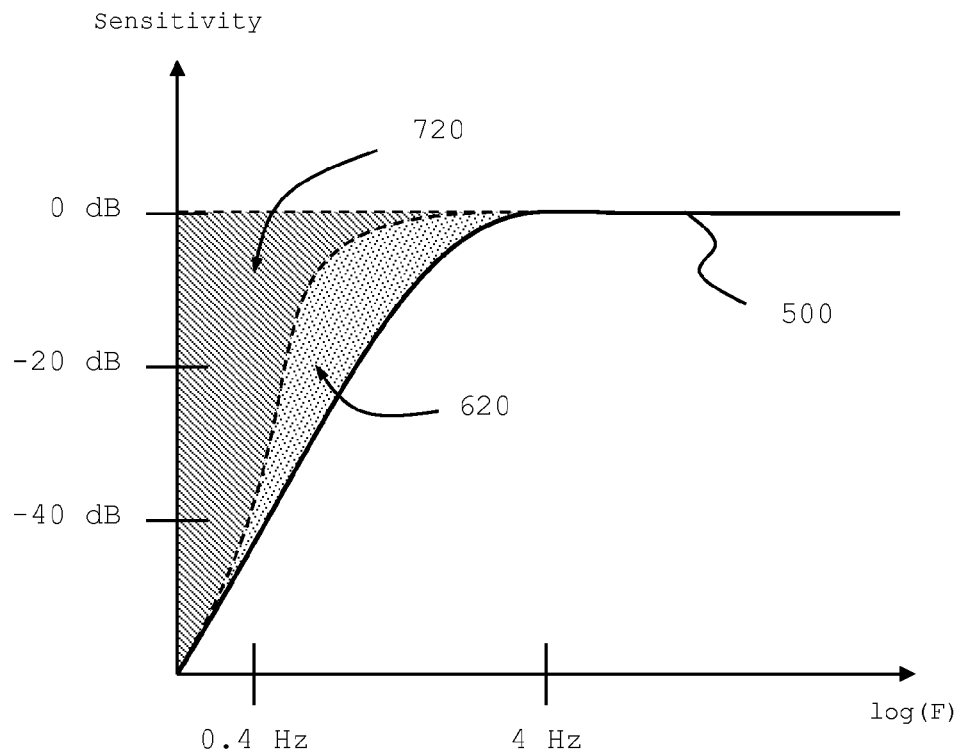

The correction of this sensitivity profile 500 is shown in FIGS. 3 and 4 for two preferred embodiments.

In the embodiment shown in FIG. 3, analog and digital frequency-response correction is performed with an essentially equal frequency dependence and in essentially equal parts. The part of the analog amplification stage 250 contributing to the correction is designated by reference symbol 610, the part of the digital amplification stage 350 contributing to the correction is designated by reference symbol 710.

For the embodiment shown in FIG. 4, the analog amplification stage 250 realizes frequency-response correction over a first frequency range and the digital amplification stage 350 realizes frequency-response correction over a second frequency range, which is different than the first. The analog frequency-response correction is performed at higher frequencies and is designated by reference symbol 620, while the digital frequency-response correction is performed at lower frequencies and is designated by the reference symbol 720.

In both embodiments, an essentially linear sensitivity profile of the vibration-signal transmitter in use is achieved over a given frequency range by a combination of analog and digital frequency-response corrections. The sensitivity to be achieved by correction and shown as a dashed line in FIGS. 3 and 4 represents an ideal case, since obviously, a completely constant profile, particularly up to an arbitrarily low frequency, cannot be realized. In this respect, FIGS. 3 and 4 serve merely as an illustration of the main principle of operation.

Figure 5:
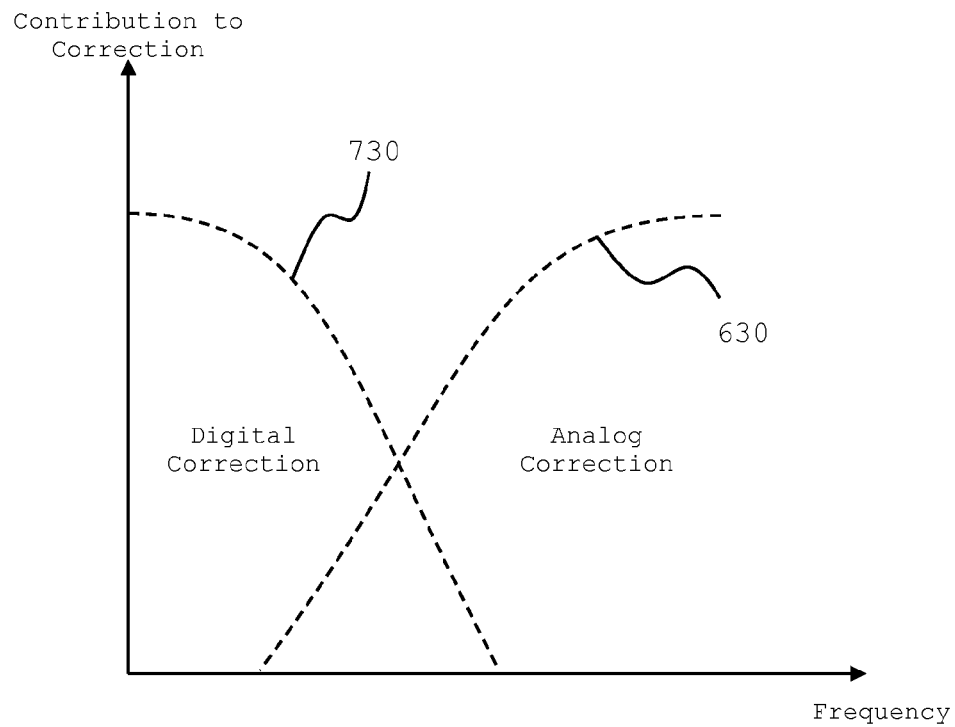

For the second embodiment, a profile 630 of the contribution to the frequency-response correction by the analog amplification stage 250 and a profile 730 of the contribution by the digital amplification stage 350 are shown in FIG. 5. The profiles in FIG. 5 show, merely schematically, example profiles in arbitrary units, where, in the example shown, the frequency ranges of the analog and digital frequency-response correction overlap. From each profile it is clear that in this embodiment the analog amplification stage 250 has high-pass characteristics and that the digital amplification stage 350 has low-pass characteristics. Therefore, the amplification stages 250 and 350 can advantageously include corresponding filter components.

Both amplification devices, the analog 250 and the digital 350, can each advantageously be designed for optimum frequency-response correction of sensor signals within a certain frequency range, where the embodiments shown are merely examples. Any other distribution of the frequency-response correction for the analog and digital amplification devices also lie within the scope of the invention.

For an example, practical realization, the vibration-signal transmitter or sensors 100 are arranged in a defined way adapted to the application, with respect to a mass to be isolated, appropriately also with respect to their directional sensitivity. The actuators 400 are similarly arranged in a suitable way relative to the mass, in order to support said mass and to isolate the vibrations of the mass relative to the surroundings or to counteract these vibrations. Furthermore, in general, for vibration isolation systems, six degrees of freedom are to be considered, where vibrations within the six degrees of freedom are registered by means of the number of sensors. Typically, the delivered sensor signals are coupled to each other, so that the control devices process the sensor signals first into decoupled axial signals, which are then further processed, in order to generate control signals on the actuator. For example, if eight actuators are provided, eight actuator control signals are also calculated accordingly, one for each control device.

What is claimed is:

1. A method for controlling a vibration isolation system, the method comprising:
   generating a sensor signal representing vibrations by means of a vibration-signal transmitter;
   amplifying the sensor signal for correcting frequency-dependent sensitivity of the vibration-signal transmitter, resulting in an amplified sensor signal, the amplifying comprising:
   i) a first amplification in a first frequency range by means of an analog amplification stage, and
   ii) a second amplification in a second frequency range by means of a digital amplification stage,
   iii) wherein the first amplification and the second amplification jointly amplify the sensor signal below a lower cutoff frequency of the vibration-signal transmitter, such that a frequency response is achieved with substantially linear sensitivity over a predetermined frequency range that is below the lower cutoff frequency;
   generating an actuator control signal by processing the amplified sensor signal; and
   controlling an actuator with the actuator control signal for counteracting the vibrations with respect to a mass to be vibration isolated.

2. The method according to claim 1, wherein the sensor signal is amplified only below the lower cutoff frequency of the vibration-signal transmitter.

3. The method according to claim 2, wherein the lower cutoff frequency lies at substantially 4 Hz.

4. The method according to claim 1, wherein the first and second amplifications are performed with substantially equal frequency dependence.

5. The method according to claim 1, wherein the first frequency range is different than the second frequency range.

6. The method according to claim 5, wherein the first frequency range lies at higher frequencies than the second frequency range.

7. The method according to claim 1, wherein the digital amplification stage is connected downstream of the analog amplification stage.

8. A correction device for correcting frequency-dependent sensitivity of a vibration-signal transmitter of a vibration isolation system, the correction device comprising:
   an analog amplification stage, constructed for amplification in a first frequency range of a sensor signal generated by the vibration-signal transmitter; and
   a digital amplification stage, constructed for amplification in a second frequency range of a digitized signal;
   wherein the analog amplification stage and the digital amplification stage are jointly operable to amplify the sensor signal below a lower cutoff frequency of the vibration-signal transmitter, such that a frequency response is achieved with substantially linear sensitivity over a predetermined frequency range that is below the lower cutoff frequency.

9. The correction device according to claim 8, constructed so that the frequency-dependent sensitivity of the vibration-signal transmitter is corrected below the lower cutoff frequency of the vibration-signal transmitter.

10. The correction device according to claim 9, wherein the lower cutoff frequency lies at substantially 4 Hz.

11. The correction device according to claim 8, wherein the analog and the digital amplification stages are constructed for amplification with a substantially equal frequency dependence.

12. The correction device according to claim 8, wherein the first frequency range and the second frequency range are different from each other.

13. The correction device according to claim 12, wherein the first frequency range lies at higher frequencies than the second frequency range.

14. The correction device according to claim 8, wherein the digital amplification stage is connected downstream of the analog amplification stage.

15. The correction device according to claim 8, wherein the digital amplification stage is arranged in a digital control device of the vibration isolation system.

16. A vibration isolation system comprising a correction device according to claim 8.

* * * * *